Figure 1:
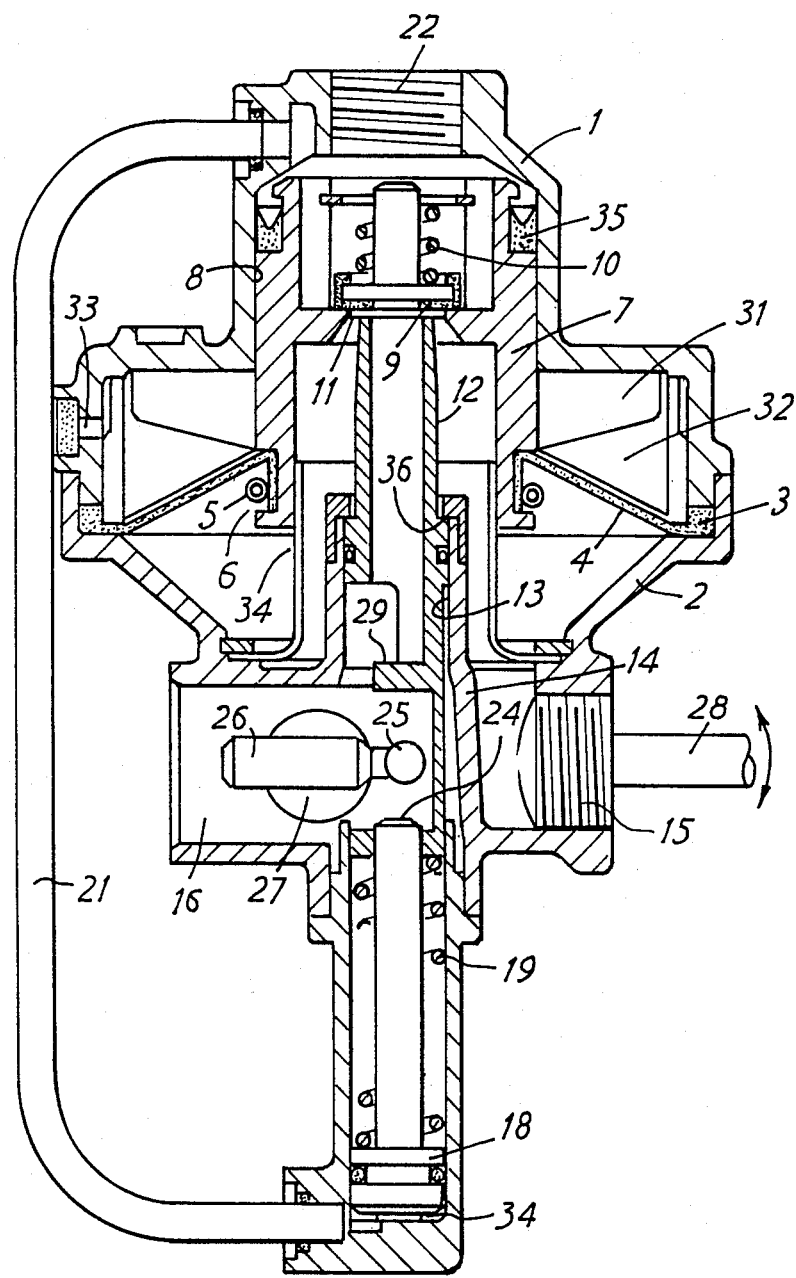

United States Patent [19]
Joseph

[11] Patent Number: 4,530,544
[45] Date of Patent: Jul. 23, 1985

[54] PRESSURE PROPORTIONING VALVES

[75] Inventor: Ian N. Joseph, Avon, England

[73] Assignee: Bendix Limited, Bristol, England

[21] Appl. No.: 582,692

[22] Filed: Feb. 23, 1984

[51] Int. Cl.³ .......................... B60T 8/18; B60T 11/34
[52] U.S. Cl. ................................. 303/22 R; 188/195;
303/28; 303/60; 303/40
[58] Field of Search ............... 303/6 C, 6 R; 188/349,
188/195; 303/22 A, 22 R, 23 R, 28–30, 40, 60;
137/627.5

[56] References Cited
U.S. PATENT DOCUMENTS 3,228,731  1/1966  Valentine .................... 303/22 R X
3,671,087  6/1972  Pekrul ........................ 303/22 R X
4,109,969  8/1978  Reinecke ..................... 303/22 R

FOREIGN PATENT DOCUMENTS 1585108  2/1981  United Kingdom .

Primary Examiner—Douglas C. Butler
Attorney, Agent, or Firm—Ken C. Decker; William H. Antonis

[57] ABSTRACT

In an air pressure proportioning variable load valve for a vehicle compressed air braking system the operating mechanism for a self-lapping valve assembly includes a fluid pressure responsive piston arrangement which is operable above a given fluid pressure (PI) to adjust the position of the self-lapping valve arrangement relative to a variable area pressure responsive assembly whereby the rising output pressure corresponds initially to rising input port pressure up to the given pressure (P1) followed by progressive adjustment before proportioning by virtue of relative areas of the variable area assembly.

6 Claims, 3 Drawing Figures

PRESSURE PROPORTIONING VALVES

This invention relates to pressure proportioning valves and relates in particular to pressure proportioning valves the characteristics of which produce output pressures directly corresponding to input or control pressure up to a predetermined value before giving for higher values of control pressure an output pressure having a variable controllable relationship to the control pressure.

Such proportioning valves are of particular application in the control of vehicle fluid pressure braking systems for controlling braking pressure in accordance with vehicle load.

In the Specification of United Kingdom Pat. No. 1,585,108 there is disclosed a pressure proportioning valve especially for variable load control of braking pressure wherein in order to overcome friction and return spring resistance in a brake mechanism when a brake application is commenced, the output pressure of the pressure proportioning valve follows a controlling pressure up to a given pressure value before the valve commences to proportion the output in accordance with a load setting. In order to achieve this a pressure responsive member of the proportioning valve is acted upon via an inshot valve with a counteracting pressure up to the given value. Furthermore, the inshot valve is arranged to progressively diminish the inshot pressure through the operating output pressure range of the proportioning valve so that it does not detrimentally affect the ratio of the proportioning valve more especially for low load settings.

An object of the present invention is to provide simpler means for achieving the initial output pressure corresponding to the input pressure up to a pre-determined value before giving an output pressure in accordance with a variable setting.

A pressure proportioning valve device including lappable double valve assembly operating means for the double valve assembly co-operable with a variable area pressure responsive means and a control member therefor, said pressure responsive means being subject to the fluid pressure at a control pressure port in a direction to tend to open a valve of the assembly, between a pressure source input port and an output port and subject to fluid pressure at the output port in an opposing direction to tend to open a valve of the assembly between the output port and a vent port and characterised by the operating means for the double valve including further fluid pressure responsive means operable above a predetermined pressure corresponding to a given input port pressure value for adjusting the position thereof relative to the variable area pressure responsive means whereat lapping of the double valve can occur towards a position set by the pressure proportioning control member whereby the output port pressure corresponds to the rising input port pressure curve up to said pressure value followed by progressive adjustment before proportioning by virtue of relative areas of the variable area pressure responsive means as set by the control member.

Figure 2:
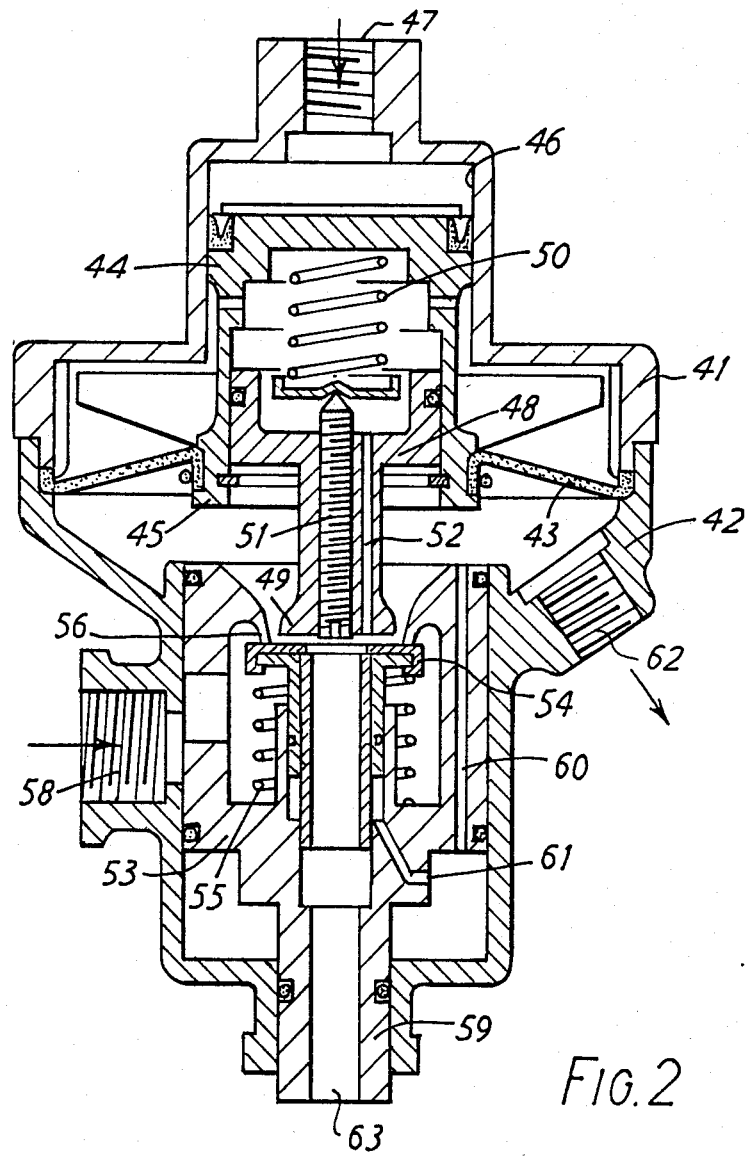
Figure 3:
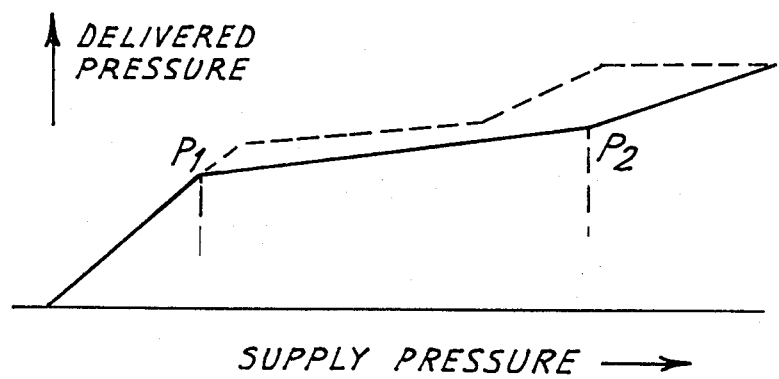

In order that the invention may be more clearly understood and readily carried into effect, the same will be further described by way of example with reference to the accompanying drawings of which:

FIG. 1 illustrates a pressure proportioning valve device in accordance with a first embodiment of the invention FIG. 2 illustrates a pressure proportioning valve device in accordance with a second embodiment and, FIG. 3 illustrates an operating characteristic to be referred to.

Referring to FIG. 1, the pressure proportioning valve device shown therein is designed for use as a variable load valve in fluid pressure operable braking systems. The device comprises upper and lower body members denoted by references 1 and 2 respectively, bolted together to clamp the periphery 3 of a variable effective area diaphragm 4 a central bead 5 of which is retained in a groove 6 of the skirt of a piston with a seal 35 slideable in a cylindrical bore 8 of the body member 1. The piston 7 carries with it a double valve member 9 which is spring loaded downwards by a spring 10 towards an inlet valve seat 11 formed on an annular flange within the piston. Projecting upwardly towards the double valve member 9 from the region beneath the piston 7 there is a tubular exhaust valve seat member 12 which is sealingly slideable in a bore 13 formed within the lower part of the housing. The piston 7 is guided by its seal 35 and a nonsealing guide member 34 and the underside of diaphragm 4 communicates with an output port 36.

The lower part of the housing incorporates a dividing wall 14 which separates an output port 15 of the device from a vented region 16. The tubular exhaust valve seat 12 has a downwardly extending part 17 between the lower surface of which and a piston 18 there is retained a spring 19. The slideable member 12, the downward extension 17 thereof and other parts form a fluid pressure responsive operating means for the double valve assembly. The piston 18 slides in a cylinder the lower end 20 of which communicates via a pipe 21 to an input port 22 for the device by which input pressure is applied on top of the piston 7. The piston 18 has an upwardly extending stem 23 the upper surface 24 of which is engageable with a ball-end 25 of a pivoted controlling lever 26 operable through a bearing 27 in the casing by an external lever 28. The ball-end 25 is trappable between the surface 24 and an internal projection 29 in the exhaust valve member 12.

Referring briefly to the variable effective area diaphragm this is of generally well-known form and comprises radially outwardly extending fingers 31 integral with the piston 7 inter-digitating with inwardly extending fingers 32 of an annular member inside the upper body member. The downwardly facing surfaces of fingers 31 and the downwardly facing surfaces of fingers 32 are mutually arranged at an angle whereby upon downward movement of the piston 7 from the position shown, the diaphragm 4 presents an increasingly effective area to pressure at the output port 15 acting beneath the diaphragm and the region above it is vented via an aperture 33.

Referring now to the operation of the pressure proportioning valve device with no pressure at the input port 22 and with an unloaded vehicle, the lever 28 is (say) in the position shown and the valve assembly takes up a position approximately as shown in FIG. 1, with the piston 18 resting against its stop 34 and with the member 12 against stop 36 by virtue of the spring 19. When input pressure at 22 begins to rise due to operation of a vehicle brake valve, after a small pressure increase, the piston 7 is slightly downwardly deflected to cause valve member 9 to seat against 12 unseating the valve member 9 from the seat 11. Input air pressure is thus applied via the unseated valve to the output port 15 and becomes effective on the underside of diaphragm 4. Owing to the effect of the spring 19, the tubular member 12 is retained over this first part of the characteristic in precisely the position shown regardless of the setting of lever 28. Output pressure therefore initially directly follows input pressure independently of the setting of lever 28 to provide a commencing operating pressure to a brake actuator up to a pre-determined input pressure at port 22 as indicated at P1 in FIG. 3.

Upon attainment of this pre-determined downward acting input pressure, at port 22 the exhaust valve member 12 and hence the piston 7 tend to begin to move downwards against the action of spring 19. Simultaneously, the input pressure communicated via pipe 21 to the region 20, acts on the underside of piston 18 in a sense to cause it to rise against the effect of spring 19. This effects an increase in the upward force transmitted to member 12 by spring 19 and tends to prevent downward movement of this member such that a balanced condition is maintained with no movement occurring.

As the input pressure continues to rise, however, piston 7, valve member 9 and member 12 gradually move downward and piston 18 continues to rise. In this manner the effective area of diaphragm 4 is progressively increased effecting progressive proportioning of the output pressure. This will continue until at a second pre-determined input pressure indicated at P2 in FIG. 3 the projection 29 of member 12 contacts ball end 25, whereupon further downward movement is prevented and the desired proportioning as set by the lever position is attained.

At a certain input pressure equal to say P3 which will depend upon the position of ball end 25, stem 23 of piston 18 comes into contact with the lower edges of ball end 25 trapping it between surface 24 and projection 29. This prevents excess stress being transmitted to lever 28 by the net downward forces transmitted through lever 26 by member 12 when input pressures exceed P3.

A subsequent reduction of input pressure is represented by the broken curve of FIG. 3. This causes piston 7 to rise thereby unseating the valve member 9 from the valve seat member 12 at a supply pressure port P4 to commence venting the region beneath diaphragm 4 to exhaust port 16.

When the delivered pressure is reduced to approximately P2, exhaust valve member 12 begins to rise lifting piston 7 and reducing the effective area of diaphragm 4. This then reduces the degree of brake pressure proportioning achieved until member 12 meets the stop 36 on body 2, whereupon the effective area of diaphragm 4 is at a minimum and the output pressure at port 15 is equal to the input pressure at port 22. This condition will then continue until both input pressure and delivery pressure are completely vented.

From the foregoing it will be appreciated that by virtue of a pressure responsive means in the form of piston 12, which is responsive to a pre-determined level of input pressure to modify the position of the piston 7 whereat lapping of the double valve can occur the output port pressure follows the input port pressure up to a given pressure value before proportioning of the output in relation to the input occurs accordingly to the adjustable ratio setting for the device.

Referring now to FIG. 2, this shows an alternative form of pressure proportioning valve in the form of a device designed to operate as a variable operable relay valve.

The device comprises an upper portion 41 and a lower housing portion 41 with an output port 62 communicating with the underside of a diaphragm 43 clamped between the two housing portions similarly to the diaphragm of FIG. 1. Concentric with the diaphragm 43 there is carried a skirt 45 of a piston 44 slideable in a cylindrical bore 46 in the upper part of the housing and an input control port 47 communicating with the upper surface of piston 44. Sealingly slideable within the skirt 45 is a pressure responsive member in the form of a smaller piston 48 carrying a downwardly projecting exhaust valve member 49 which co-operates with a moveable double valve assembly carried in the lower part of the housing. The piston 48 is spring loaded by virtue of a spring 50 trapped within the piston 45 and the state of compression of which is adjustable by an adjusting screw 51. Furthermore, a vent passage 52 is provided alongside the adjusting screw 51. The piston 48 and member 49 constitute a pressure responsive operating means for the double valve assembly.

Referring now to the double valve assembly, this is carried in a sealingly slideable plunger 53 and comprises a double valve member 54 urged by a light spring 55 towards an input valve seat 56 to which communication is provided via an aperture 57 from an input or reservoir port 58. Although not shown, the plunger 53 has means for adjusting the vertical position of its stem 59 for adjusting the ratio of the valve assembly. In addition, for the purposes of balancing pressures on the self-lapping valve arrangements, two small passages 60 and 61 are provided whereby the pressure under diaphragm 43 is communicated to the annulus 63 acting upwards on the double valve.

In operation of the pressure proportioning relay valve of FIG. 2 and with zero control pressure initially applied at port 47, the double valve is at rest with the lower end of 51 against the valve member and the valve member against the inlet valve seat 56. This is so under the influence of springs 50 and 55. When the input pressure begins to rise this acts on the piston 44 which after overcoming the force of light spring 55 unseats the valve member from seat 56 thereby allowing air under pressure to be supplied from the reservoir via port 58 to an output port 62 and to the under-side of the diaphragm. Upon attainment of a pre-determined pressure say 0.7 bar the spring 50 begins to yield to the action of the piston 48 under the influence of the fluid pressure at the output port and this piston progressively moves with increasing input pressure to its upper stop in piston 44 thereby allowing the diaphragm assembly to move downwards to balance the effects of the input pressure above piston 44 and the output pressure below diaphragm 43 whereupon the double valve laps with both seats closed off.

By virtue of the piston 48 and spring 50 it is therefore seen that the position of the pressure responsive assembly whereat lapping of the double valve can occur is conditioned upon attainment of the pre-determining pressure whereby the output pressure follows the input pressure up to this value to apply a sufficient working pressure to a brake actuator before the device effects proportioning of the output pressure and the control pressure in accordance with the setting of the device by the positioning of the lower plunger 53 and valve assembly in accordance with vehicle loading.

It will be seen from FIG. 1 and FIG. 2 that alternative embodiments of the invention may readily now be devised herein the device is either a direct pressure proportioning valve device or is a pressure relay device. In addition it will be observed that the pressure corresponding to the control pressure to which the further pressure responsive means responds, may either be the control pressure iself as in FIG. 1 or, alternatively, it may be the delivered pressure as in FIG. 2 or even some derivation thereof.

I claim:

1. A variable pressure proportioning device comprising a housing having an inlet pressure chamber, an outlet pressure chamber, a fluid pressure responsive member slidable in said housing and having a fixed effective area exposed to the fluid pressure level in the inlet chamber, a diaphragm supported by said housing and having an effective area which varies in response to movement of said diaphragm within said housing, said effective area of said diaphragm being exposed to the fluid pressure level in the outlet chamber, said diaphragm being connected to said fluid pressure responsive member and acting in opposition to the forces applied to the member by the pressure level acting on the fixed effective area of the latter, a pressure ratio control member slidably mounted in said housing, a double valve assembly comprising an exhaust valve seat carried by said pressure ratio control member, an outlet valve seat carried by said fluid pressure responsive member, and a valve element engageable with said outlet valve seat to control communication between said inlet and outlet chambers and engageable with said exhaust valve seat to control communication between said outlet chamber and said exhaust chamber, resilient means yieldably urging said valve element into sealing engagement with said control valve seat, means for moving said pressure ratio control member in said housing to vary the force required to cause said valve element to close against said valve seats and to thereby vary the effective ratio of the pressures in the inlet and outlet pressure chambers, and a biased pressure responsive means for progressively changing the fluid pressure force required to urge said valve element against the control valve seat after the pressure level in one of said inlet and outlet chambers attains a predetermined level.

2. Variable pressure proportioning device as claimed in claim 1, wherein said biased pressure responsive means includes means connecting said biased pressure responsive means with said pressure ratio control member.

3. Variable pressure proportioning device as claimed in claim 2, wherein said biased pressure responsive means is a piston slidably mounted in said housing in response to the variations in the fluid pressure level in the inlet pressure chamber.

4. Variable pressure proportioning device as claimed in claim 2, wherein said connecting means is a resilient element.

5. Variable pressure proportioning device as claimed in claim 2, wherein said proportioning device is mounted on a motor vehicle, and said means for moving said pressure control element is a lever movable in response to variations of the load carried by the vehicle.

6. Variable pressure proportioning device as claimed in claim 2, and means for permitting movement of the pressure ratio control member independently of said means for moving said pressure ratio control member until a predetermined pressure level is attained in the inlet or outlet pressure chambers, said movement permitting means connecting said pressure ratio control member for movement by said means for moving the pressure control member after said predetermined pressure level is attained.

* * * * *